(12) United States Patent
Farooq et al.

(10) Patent No.: US 11,685,336 B1
(45) Date of Patent: Jun. 27, 2023

(54) VEHILCE-HOOD ASSEMBLY INCLUDING ENERGY ABSORBERS

(71) Applicant: Ford Global Technologies, LLC, Dearborn, MI (US)

(72) Inventors: S. M. Iskander Farooq, Novi, MI (US); Saeed D. Barbat, Novi, MI (US); Dean M. Jaradi, Macomb, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/555,590

(22) Filed: Dec. 20, 2021

(51) Int. Cl.
*B60R 21/34* (2011.01)
*B60R 21/0136* (2006.01)

(52) U.S. Cl.
CPC .......... *B60R 21/34* (2013.01); *B60R 21/0136* (2013.01)

(58) Field of Classification Search
CPC ..... B60R 21/34; B60R 21/38; B60R 21/0136; B60R 2021/0266; B60R 21/0428; B60R 2021/0273; B60R 21/36; B60R 2021/343; B60R 2021/346; B62D 25/105
See application file for complete search history.

(56) References Cited

U.S. PATENT DOCUMENTS

| | | | |
|---|---|---|---|
| 3,853,334 A * | 12/1974 | Auman | B60R 21/16 280/728.3 |
| 6,386,623 B1 | 5/2002 | Ryan et al. | |
| 6,848,738 B2 * | 2/2005 | Kempf | B62D 25/105 296/193.11 |
| 6,883,627 B1 | 4/2005 | Staines et al. | |
| 7,246,677 B2 | 7/2007 | Fredriksson et al. | |
| 7,264,271 B2 * | 9/2007 | Barvosa-Carter | B60R 21/04 297/284.6 |
| 7,467,680 B2 | 12/2008 | Mason | |
| 7,686,120 B2 | 3/2010 | Browne et al. | |
| 7,950,488 B2 | 5/2011 | Browne et al. | |
| 8,052,198 B2 | 11/2011 | Seksaria et al. | |
| 9,783,236 B1 * | 10/2017 | Rivera | B62D 25/105 |
| 10,246,044 B2 | 4/2019 | Barbat et al. | |
| 2004/0182616 A1 | 9/2004 | Mason | |
| 2017/0232925 A1 * | 8/2017 | Barbat | B60R 21/36 280/734 |
| 2017/0232926 A1 * | 8/2017 | Barbat | B60R 21/38 180/274 |

(Continued)

FOREIGN PATENT DOCUMENTS

| | | | | |
|---|---|---|---|---|
| DE | 19851489 A1 * | 5/2000 | | B60R 21/34 |
| DE | 10059795 A1 * | 6/2002 | | B60R 21/34 |
| DE | 10061510 A1 | 6/2002 | | |

(Continued)

*Primary Examiner* — Paul N Dickson
*Assistant Examiner* — Matthew D Lee
(74) *Attorney, Agent, or Firm* — Frank A. MacKenzie; Bejin Bieneman PLC

(57) ABSTRACT

A vehicle-hood assembly includes a vehicle hood and an energy absorber fixed to the vehicle hood. The energy absorber is releasable from a compressed position to an uncompressed position. The energy absorber includes a chamber that is sealed and vacuum pressurized in the compressed position. An actuator is configured to unseal the chamber to release the energy absorber from the compressed position to the uncompressed position.

20 Claims, 7 Drawing Sheets

(56) References Cited

U.S. PATENT DOCUMENTS

2021/0016839 A1 * 1/2021 Lein .................. B60R 21/34

FOREIGN PATENT DOCUMENTS

| | | | | |
|---|---|---|---|---|
| DE | 10063586 A1 | 8/2002 | | |
| DE | 10117214 A1 * | 10/2002 | ............. | B60R 21/34 |
| DE | 10247800 A1 | 4/2004 | | |
| DE | 20221142 U1 | 5/2005 | | |
| DE | 02005038682 A1 | 4/2006 | | |
| DE | 202013009616 U1 | 2/2015 | | |
| EP | 3766763 A1 * | 1/2021 | ............. | B60R 21/34 |
| GB | 2399550 A * | 9/2004 | ............. | B60R 21/34 |
| JP | 3840711 B2 | 11/2006 | | |
| WO | 0198118 A2 | 12/2001 | | |
| WO | WO-2010059198 A1 * | 5/2010 | ............. | B32B 15/04 |
| WO | WO-2012153344 A2 * | 11/2012 | ............. | B60R 21/34 |

\* cited by examiner

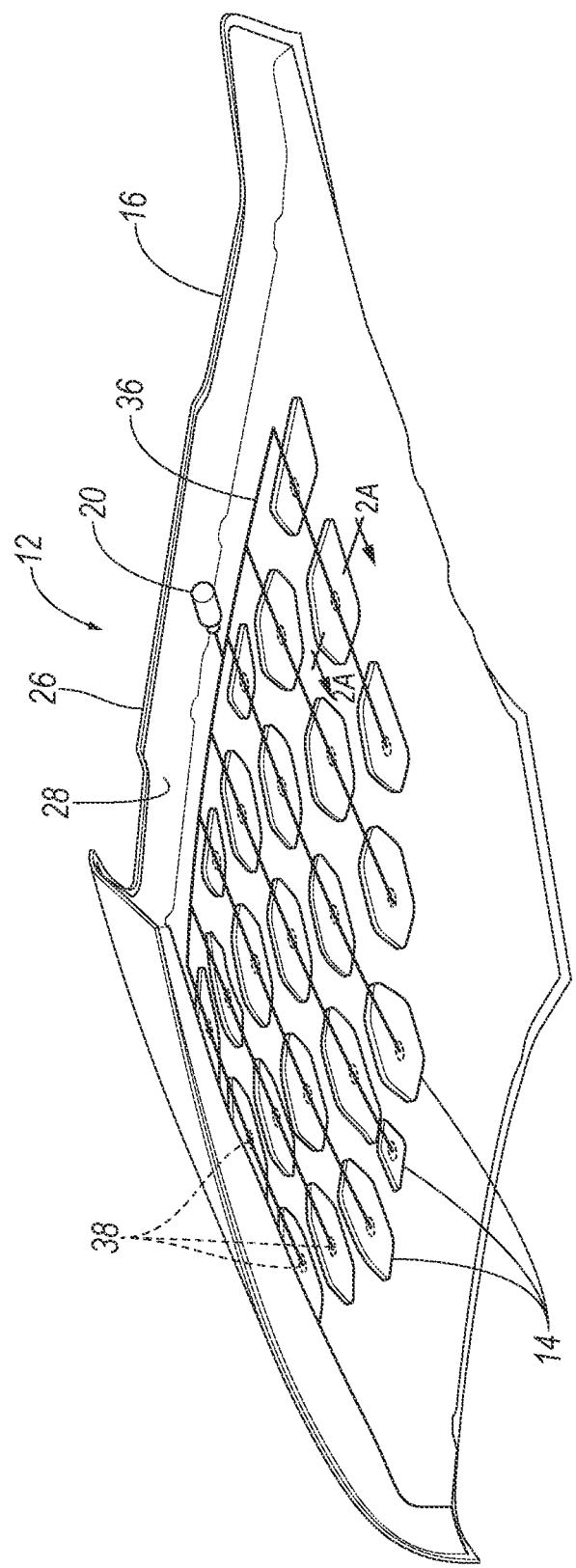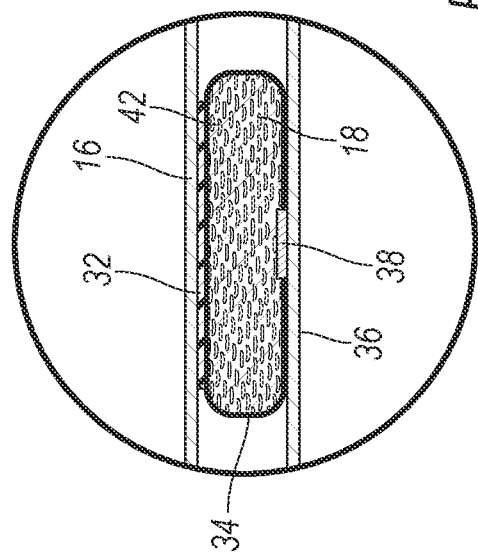

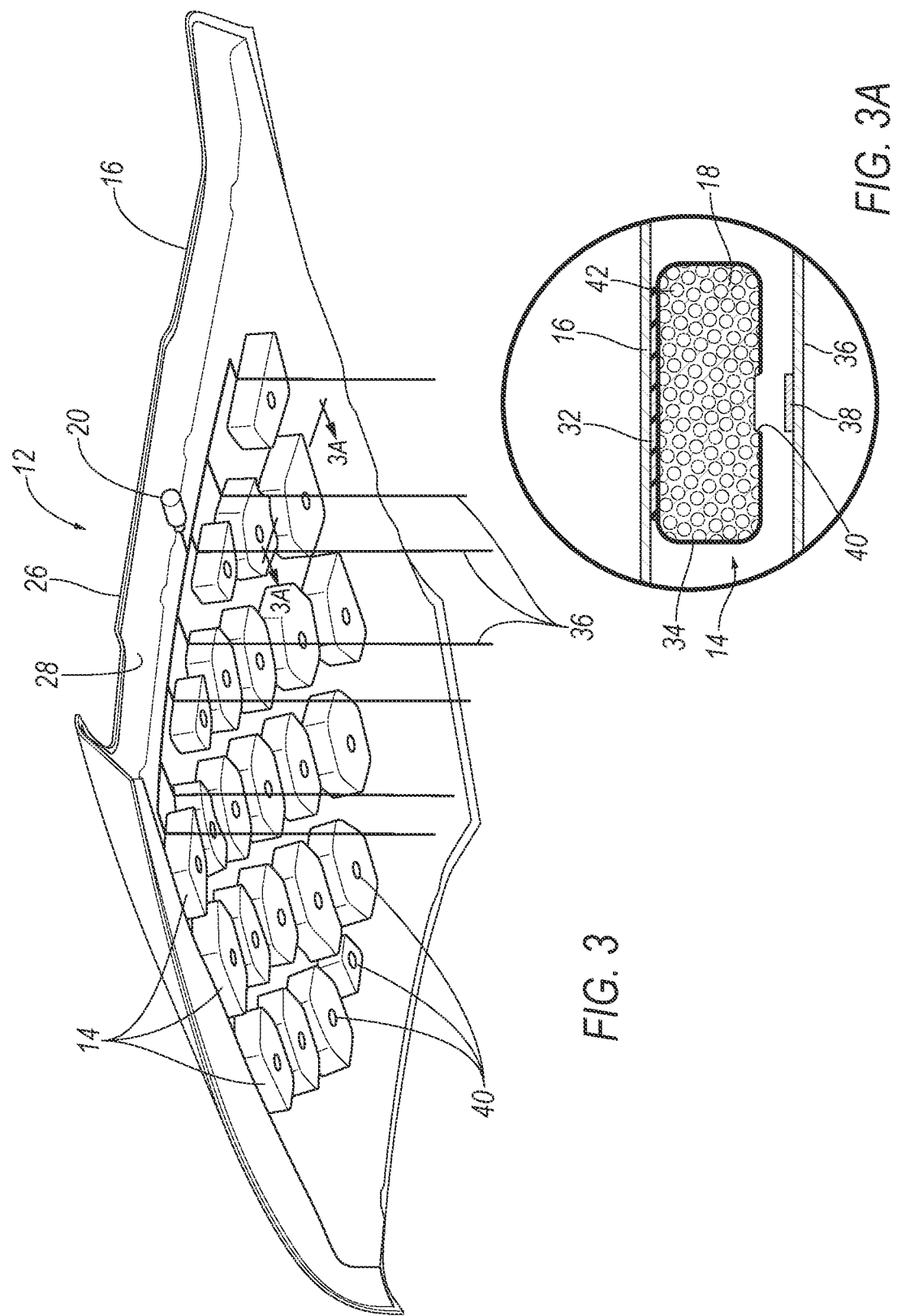

VEHILCE-HOOD ASSEMBLY INCLUDING ENERGY ABSORBERS

BACKGROUND

The vehicle may include a pedestrian protection device such as an airbag deployable during a pedestrian impact to control the kinematics of a pedestrian outside of the vehicle during the pedestrian impact. The airbag may be inflatable over a hood and/or front bumper of the vehicle. Specifically, the airbag may be a component of an airbag assembly including an inflator that inflates the airbag in response to detected pedestrian impact.

BRIEF DESCRIPTION OF THE DRAWINGS

FIG. 2 is a perspective view of the vehicle-hood assembly showing a bottom side of a hood and energy absorbers with the energy absorbers in a compressed position.

FIG. 2A is a cross-section of a portion of the vehicle-hood assembly of FIG. 2.

FIG. 3 is a perspective view of the vehicle-hood assembly with the energy absorbers in an uncompressed position.

FIG. 3A is a cross-section of a portion of the vehicle-hood assembly of FIG. 3.

DETAILED DESCRIPTION

Figure 1:
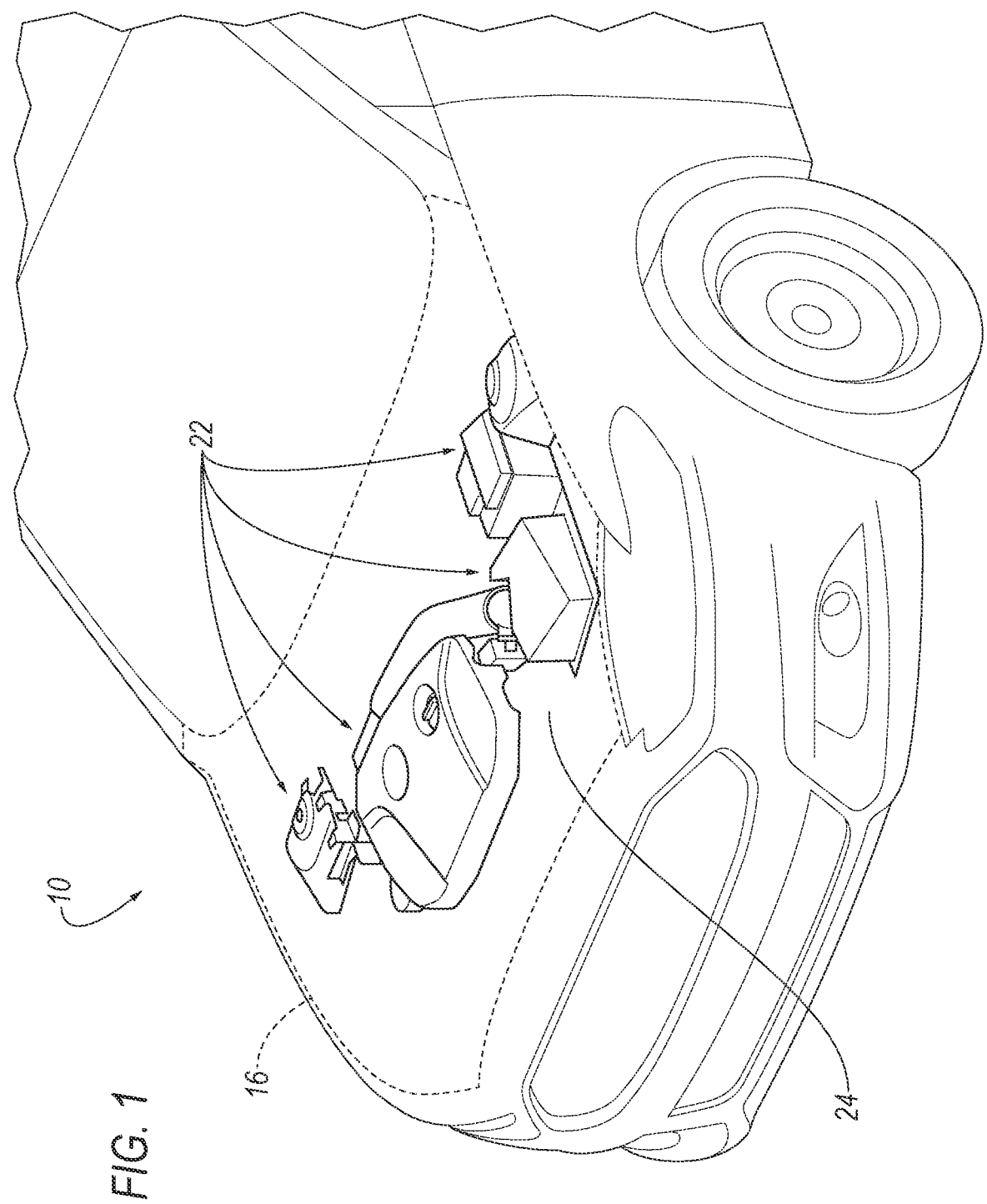
FIG. 1 is a perspective view of a vehicle with a vehicle hood shown in broken lines to illustrate vehicle components in a utility compartment below the vehicle hood.
Figure 4:
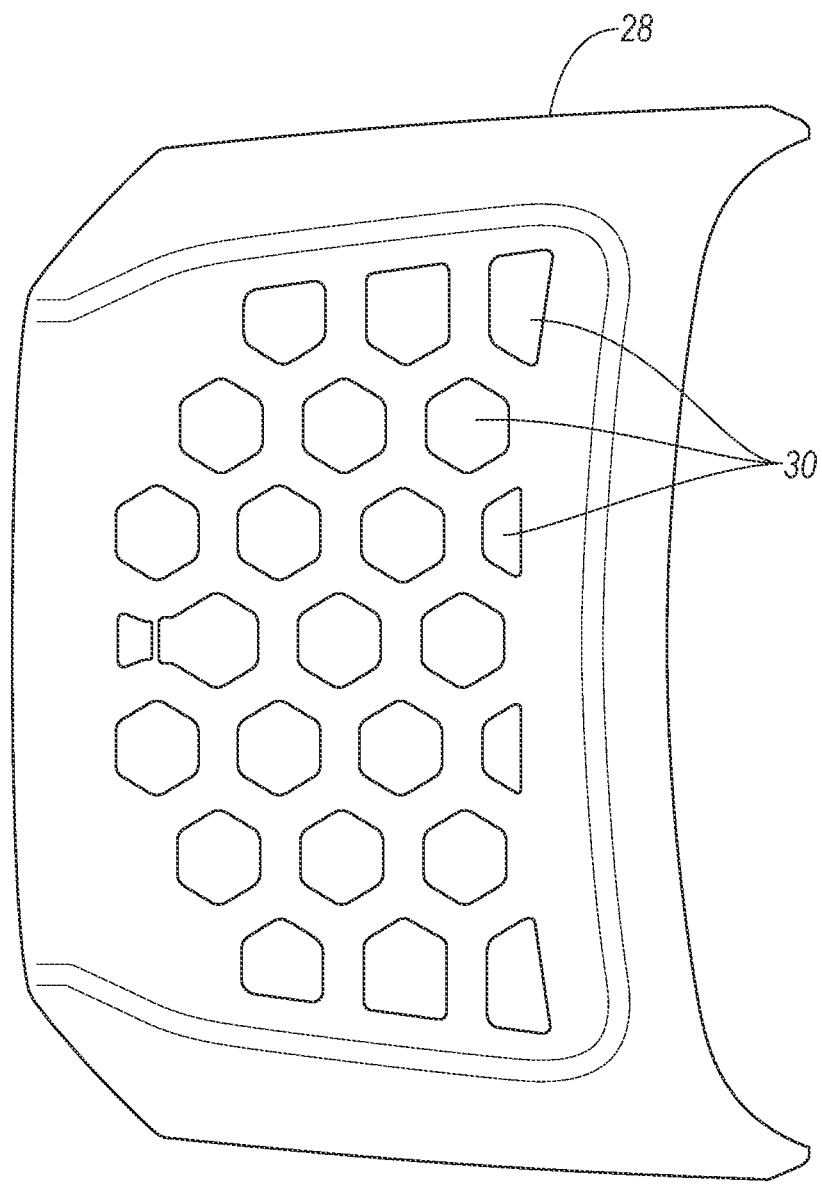
FIG. 4 is a bottom view of an inner hood of the vehicle hood.
Figure 5:
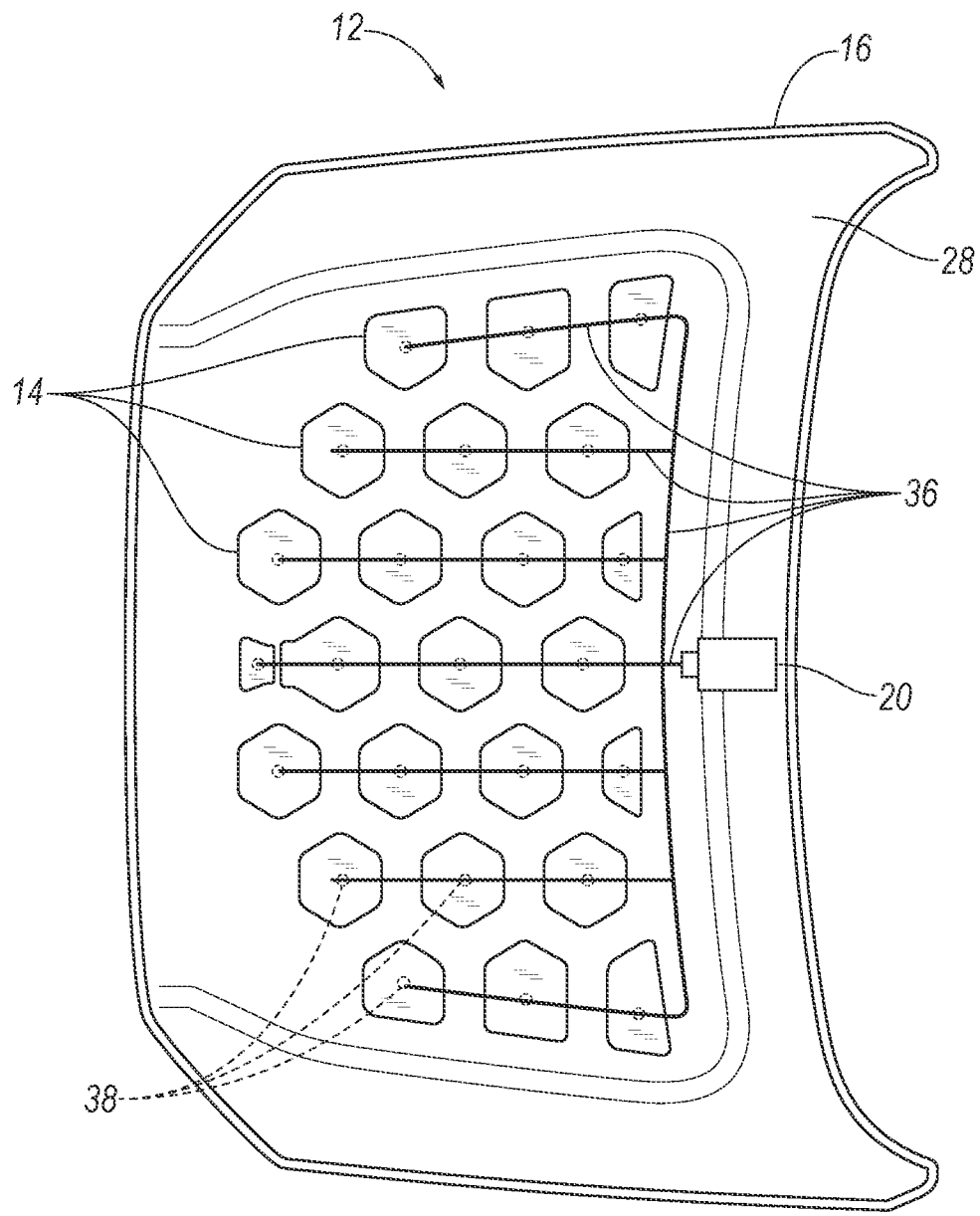
FIG. 5 is a bottom view of the vehicle-hood assembly.
Figure 6:
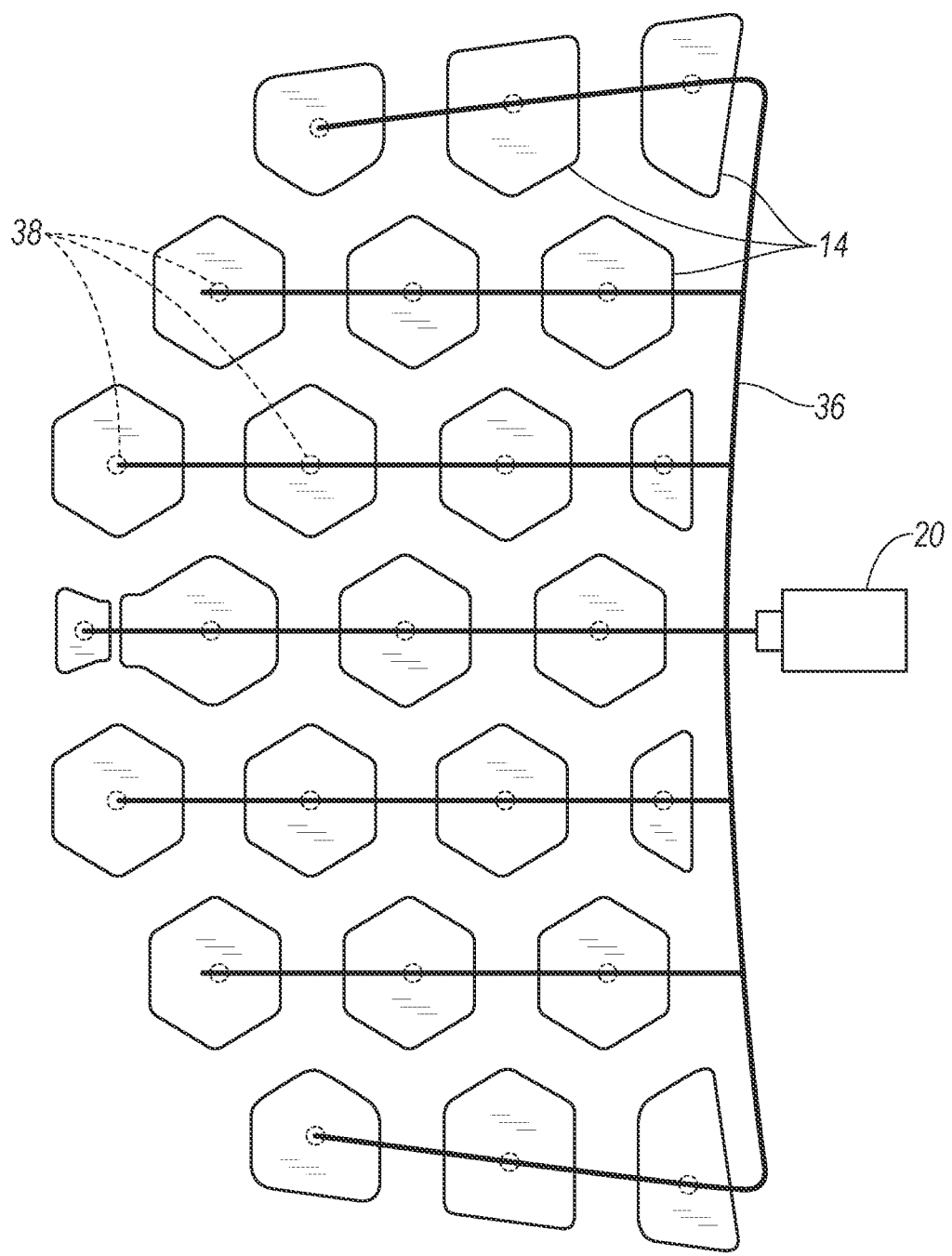
FIG. 6 is a plan view of the energy absorbers, an actuator, and a wire operatively connected to the energy absorbers to unseal chambers of the energy absorbers.

A vehicle-hood assembly includes a vehicle hood and an energy absorber fixed to the vehicle hood. The energy absorber is releasable from a compressed position to an uncompressed position. The energy absorber includes a chamber that is sealed and vacuum pressurized in the compressed position. An actuator is configured to unseal the chamber to release the energy absorber from the compressed position to the uncompressed position.

The vehicle-hood assembly may include more than one of the energy absorber, the energy absorbers being spaced from each other along the vehicle hood. The actuator may be operatively connected to each of the energy absorbers to unseal the chambers of the energy absorbers.

The energy absorber may include an open-celled foam. The energy absorber may include a membrane surrounding the chamber, the membrane being impermeable to air. The energy absorber may include a plug through the membrane, the actuator being operatively connected to the plug. The vehicle-hood assembly may include a wire extending from the actuator to the plug.

The vehicle-hood assembly may include a wire extending from the actuator to the energy absorber.

The actuator may be a pyrotechnic actuator.

The vehicle-hood assembly may include adhesive connecting the energy absorber to the vehicle hood.

The energy absorber may expand in a direction away from the vehicle hood from the compressed position to the uncompressed position.

A vehicle includes a vehicle hood and a vehicle component beneath the vehicle hood. The vehicle component is rigid relative to the vehicle hood. An energy absorber is between the vehicle hood and the vehicle component. The energy absorber is fixed to the vehicle hood. The energy absorber is releasable from a compressed position to an uncompressed position. The energy absorber includes a chamber that is sealed and vacuum pressurized in the compressed position. An actuator is configured to unseal the chamber to release the energy absorber from the compressed position to the uncompressed position.

The vehicle component may be a vehicle-engine.

The vehicle-hood assembly may include more than one of the energy absorber, the energy absorbers being spaced from each other along the vehicle hood. The actuator may be operatively connected to each of the energy absorber.

The energy absorber may include an open-celled foam. The energy absorber may include a membrane surrounding the chamber, the membrane being impermeable to air. The energy absorber may include a plug through the membrane, the actuator being operatively connected to the plug.

The energy absorber may be supported by and connected to the vehicle hood.

The energy absorber may expand from the compressed position to the uncompressed position toward the vehicle component.

With reference to the figures, wherein like numerals indicate like parts throughout the several views, a vehicle-hood assembly 12 for a vehicle 10 includes a vehicle hood 16. The vehicle-hood assembly 12 includes an energy absorber 14 fixed to the vehicle hood 16. The energy absorber 14 is releasable from a compressed position, as shown in FIGS. 2-2A, to an uncompressed position, as shown in FIGS. 3-3A. The energy absorber 14 includes a chamber 18 that is sealed and vacuum pressurized in the compressed position. The vehicle-hood assembly 12 includes an actuator 20 configured to unseal the chamber 18 to release the energy absorber 14 from the compressed position to the uncompressed position.

The energy absorber 14 consumes less space in the compressed position relative to the uncompressed position to reduce packaging constraints in the design of the vehicle hood 16. The energy absorber 14 is attached to the vehicle hood 16 and may be released from the compressed position to the uncompressed position in response to a pedestrian impact. The energy absorber 14 includes the chamber 18 that is vacuum sealed in the compressed position. Since the chamber 18 is sealed and vacuum pressurized in the compressed position, the vacuum is released when the actuator 20 unseals the chamber 18. When unsealed, the chamber 18 allows ambient air to fill the chamber 18, thus expanding the energy absorber 14 from the compressed position to the uncompressed position. As shown in the figures, the energy absorber 14 in the uncompressed position controls the kinematics of a pedestrian during pedestrian impact. Specifically, the energy absorber 14 in the uncompressed position is between the pedestrian and vehicle components 22 that are rigid relative to the vehicle hood 16, e.g., an engine, hold latch, strut tower, etc., to cushion impact with the vehicle components 22.

The vehicle 10 may be any suitable type of automobile, e.g., a passenger or commercial automobile such as a sedan, a coupe, a truck, a sport utility, a crossover, a van, a minivan, a taxi, a bus, etc. As shown in FIG. 1, the vehicle 10 includes a vehicle body (not numbered). The vehicle body may be of a unibody construction in which a vehicle frame is unitary with the vehicle body or may have a body-on-frame construction (also referred to as a cab-on-frame construction) in which the vehicle body and vehicle frame are separate components, i.e., are modular, and the vehicle body is supported on and affixed to the vehicle frame. Alternatively, the vehicle frame and vehicle body may have any suitable construction. The vehicle frame and vehicle body may be of any suitable material, for example, steel, aluminum, and/or fiber-reinforced plastic, etc.

With reference to FIG. 1, the vehicle body and/or the vehicle frame defines a utility compartment 24. As discussed further below the utility compartment 24 is below the vehicle hood 16. The utility compartment 24 may, for example, house one or more vehicle components 22 such as powertrain components, e.g., an internal combustion engine, transmission, electric-vehicle batteries, energy-transmission hardware for electric-vehicle operation, etc. In other words, the utility compartment 24 may be a powertrain compartment such as an engine compartment. As another example, the utility compartment 24 may include a storage space, e.g., may be a front trunk (i.e., a frunk).

The vehicle components 22 under the vehicle hood 16 may be rigid relative to the vehicle hood 16. In other words, during a pedestrian impact, the vehicle hood 16 deforms more easily than the vehicle components 22 under the vehicle hood 16 during a pedestrian impact. The vehicle components 22 may be, for example, powertrain components, e.g., an internal combustion engine, transmission, electric vehicle 10 batteries, energy-transmission hardware for electric-vehicle operation, etc. As another example, the vehicle components 22 may be vehicle body and or vehicle frame components, e.g., frame rails, shock towers, a cowl, etc. As another example, the vehicle components 22 may be steering and/or suspension components, e.g., shocks, struts, etc.

With reference to FIGS. 1-3A, the energy absorber 14 may be positioned between the vehicle hood 16 and one or more of the vehicle components 22. Accordingly, in a pedestrian impact, the energy absorber 14 in the uncompressed position controls the kinematics of the pedestrian relative to the vehicle components 22, which, as stated above, may be rigid relative to the vehicle hood 16.

With reference to FIGS. 2-5, the vehicle body includes the vehicle hood 16. The vehicle hood 16 is supported by and attached to the rest of the vehicle body and/or the vehicle 34 frame. For example, the vehicle-hood assembly 12 may include a hinge (not shown) rotatably connecting the vehicle hood 16 to the rest of the vehicle body. The vehicle hood 16 is rotatable about the hinge between an open position providing access to the utility compartment 24 and a closed position preventing access to the utility compartment 24. The vehicle hood 16 and the energy absorber 14 move together as a unit about the hinge as described further below. The vehicle body and/or the vehicle frame includes a latch (not shown) between the vehicle hood 16 and the vehicle body and/or vehicle frame. The latch selectively fixes the vehicle hood 16 in the closed position.

The vehicle hood 16 includes an outer hood 26 disposed above an inner hood 28. As shown in the figures the outer hood 26 is exposed the environment surrounding the vehicle 10 when the vehicle hood 16 assembly is in a closed position. The outer hood 26 includes a top surface of the vehicle hood 16. The outer hood 26, i.e., the top surface, may present a class-A surface, e.g., a finished surface exposed to view by a customer and free of unaesthetic blemishes and defects. The inner hood 28 includes a bottom surface of the vehicle hood 16 that faces the utility compartment 24.

The inner hood 28 and the outer hood 26 may be the same type of material or different types of material. For example, the inner hood 28 and the outer hood 26 may be metal, e.g., aluminum, steel, etc. As another example, the inner hood 28 and/or outer hood 26 may be plastic, for example, sheet molding composite (SMC), carbon fiber reinforced plastic (CFRP), fiberglass, and/or other fiber reinforced plastic.

The outer hood 26 is fixed relative to the inner hood 28. Specifically, the outer hood 26 is directly or indirectly attached to the inner hood 28. Alternatively, the inner hood 28 and/or the outer hood 26 may include a hem flange connecting the inner hood 28 to the outer hood 26. The vehicle hood 16 may include a thermal shield between the inner hood 28 and the utility compartment 24 with the energy absorber 14 between the thermal shield and the inner hood 28. The thermal shield may be, for example, DuPont™ Nomex® 410, or any other suitable material type.

The vehicle hood 16 includes a gap 30 (FIG. 4) between the inner hood 28 and the outer hood 26. Specifically, the gap 30 extends vertically from the inner hood 28 to the outer hood 26. The gap 30 may extend through the inner hood 28, e.g., may be open to the utility compartment 24 below the vehicle hood 16. The outer hood 26 and/or the inner hood 28 may deform to compress the gap 30 to control the kinematics of a pedestrian during pedestrian impact. The energy absorber 14 may be in the gap 30, e.g., where the gap 30 extends through the inner hood 28, in the uncompressed position.

As set forth above, the vehicle-hood assembly 12 includes at least one energy absorber 14. In the example, shown in the figures, the vehicle-hood assembly 12 includes more than one of the energy absorber 14. In such an example, the energy absorbers 14 may be spaced from each other along the vehicle hood 16. For example, each energy absorber 14 may be dedicated to one or more vehicle components 22, i.e., to cushion the vehicle component 22 during a pedestrian impact to control the kinematics of the pedestrian. In such examples, more than one of the energy absorbers 14 may be dedicated to the same vehicle component 22 and/or one energy absorber 14 may be dedicated to multiple vehicle components 22. In examples including more than one energy absorber 14, the energy absorbers 14 may be identical or different (i.e., shape, size, material type, etc.). In the examples shown in the figures, the energy absorbers 14 are identified with common numerals.

During a pedestrian impact, the vehicle hood 16 may deform and/or the energy absorber 14 may deform to control the kinematics of the pedestrian relative to vehicle components 22 below the vehicle hood 16. The energy absorber 14 expands in a direction away from the vehicle hood 16 from the compressed position to the uncompressed position. Specifically, the energy absorber 14 expands from the compressed position to the uncompressed position toward the vehicle component 22. In the examples shown in the figures, the energy absorber 14 expands downwardly away from the bottom surface of the inner panel of the vehicle hood 16.

With reference to FIGS. 2-3A, the energy absorber 14 is fixed to the vehicle hood 16 in both the compressed and the uncompressed position. As an example, the energy absorber 14 may be fixed to the bottom surface of the vehicle hood 16. As an example, the energy absorber 14 may be bonded to the bottom surface with an adhesive 32 (FIGS. 2A and 3A) and/or fixed to the bottom surface with fasteners, plastic welding, pins, etc. In examples including adhesive 32 bonding the energy absorber 14 to the bottom surface, the adhesive 32 may extend along the elongated path along the periphery of the energy absorber 14. The adhesive 32 may be, for example, polyurethane or any suitable type of adhesive.

With reference to FIGS. 2A and 3A, the chamber 18 of the energy absorber 14 is sealed in the compressed position. Specifically, the energy absorber 14 may include a membrane 34 surrounding the chamber 18. The membrane 34 is impermeable to air. Specifically, the membrane 34 hermetically seals the chamber 18.

The chamber 18 of the energy absorber 14 is vacuum pressurized in the compressed position. In other words, the chamber 18 is at a negative pressure relative to external ambient air. Since the chamber 18 is sealed, the negative pressure is maintained. For example, the membrane 34 maintains the negative pressure in the chamber 18.

As set forth below, an actuator 20 configured to unseal the chamber 18 to release the energy absorber 14 from the compressed position to the uncompressed position. The actuator 20 releases the negative pressure in the chamber 18 to external ambient air. The actuator 20 is operatively connected to each of the energy absorbers 14 to unseal the chamber 18s of the energy absorbers 14. Specifically, the actuator 20 is operatively connected to the membrane 34 to open the chamber 18 to external ambient air allowing the chamber 18 to de-pressurize and the energy absorber 14 to expand to the uncompressed position. For example, a wire 36 may extend from the actuator 20 to the energy absorber 14 and the actuator 20 may be designed to pull the wire 36 to disengage the wire 36 from the energy absorber 14 and open the chamber 18 to external ambient air. Specifically, the wire 36 opens a hole 40 (FIGS. 2-3A) through the membrane 34 to allow external ambient air to flow therethrough.

As an example shown in FIGS. 2-3A, the energy absorber 14 may include a plug 38 through the membrane 34. The plug 38 maintains the energy absorber 14 in the compressed state. Specifically, the plug 38 fills the hole 40 and prevents airflow through the hole 40 to maintain the energy absorber 14 in the compressed state. In such an example, the actuator 20 is operatively connected to the plug 38 to remove the plug 38 from the membrane 34, e.g., with the wire 36, and open the chamber 18 to external ambient air to release the energy absorber 14 to the uncompressed state. The plug 38 may be the same type of material as the membrane 34 or a different type of material. The plug 38 may be thicker than the membrane 34. The plug 38 may be connected to the membrane 34 by adhesive, bonding, welding, etc. As another example, the plug 38 may be unitary with the membrane 34. In other words, the plug 38 and the membrane 34 may be a single, uniform piece of material with no fasteners, adhesives, weld lines, etc., holding them together, i.e., formed together simultaneously as a single continuous unit, e.g., by molding, etc. In such an example, the energy absorber 14 may have a weakened area, e.g., a tear seam, between the plug 38 and the membrane 34. Non-unitary components, in contrast, are formed separately and subsequently assembled, e.g., by adhesive, bonding, welding, etc. As another example in the alternative to the plug 38, the wire 36 may be connected to an outer surface of the membrane 34 and/or may be embedded in the membrane 34 such that, when the actuator 20 pulls the wire 36, the wire 36 tears the membrane 34 to open the chamber 18 to external ambient air.

The energy absorber 14 expands in size from the compressed position to the uncompressed position. In other words, the energy absorber 14 is relatively smaller in the compressed position and expands in size from the compressed position to the uncompressed position. For example, when vacuum pressurized, the vacuum in the chamber 18 retracts the membrane 34, e.g., folds the membrane 34 onto itself. In such an example, the chamber 18 is smaller in the compressed position than in the uncompressed position. The energy absorber 14 is designed to expand in size toward vehicle components 22, e.g., to expand downwardly into the utility compartment 24.

The energy absorber 14 may include an open-celled foam 42. In such an example, the open-celled foam 42 is in the cavity. For example, the open-celled foam 42 may fill the cavity. The open-celled foam 42 is compressed, i.e., reduced in size under pressure, in the compressed position. For example, the vacuum pressurization of the chamber 18 compresses the open-celled foam 42 in the compressed position of the energy absorber 14. In such an example, the membrane 34 acts on the open-celled foam 42 to compress the open-celled foam 42. When compressed in the compressed position, the open-celled foam 42 is resiliently compressed. In other words, when external compressive forces of the membrane 34 are released when the chamber 18 is exposed to external ambient air, the open-celled foam 42 expands. This expansion forces the membrane 34 to expand as the energy absorber 14 moves to the uncompressed position. In other words, the vacuum pressurization of the chamber 18 draws in the membrane 34 to compress the open-celled foam 42 in the compressed position, and when the vacuum pressurization is released, the compressive force of the membrane 34 on the open-celled foam 42 is released and the open-celled foam 42 moves the membrane 34 to the uncompressed position.

The open-celled foam includes cells. In the compressed position of the energy absorber 14, the cells are compressed, as shown in FIG. 2A. The cells resiliently decompress and expand in size when the energy absorber 14 moves to the decompressed position, as shown in FIG. 3A. The cells may fill with air as the energy absorber 14 moves from the compressed position to the uncompressed position. The open-celled foam 42 may be, for example, open-celled polyurethane or any suitable type of material. As another example, the chamber 18 may be filled with any suitable type of foam including compressible closed-cell foam that is compressed by the membrane 34 in the compressed position and released by the membrane 34 in the uncompressed position.

In the example in which the energy absorber 14 includes open-celled foam 42 in the cavity, the membrane 34 may be silicone. In such an example, the membrane 34 may be applied as a silicone coating sprayed onto the open-celled foam 42. As another example in which the energy absorber 14 includes open-celled foam 42 in the cavity, the membrane 34 may the same material type as the open-celled foam 42 and may be solid to prevent airflow therethrough.

As set forth above, the vehicle hood 16 assembly may include one or more actuators 20. The example shown in the figures includes one actuator 20 by way of example, i.e., the actuator 20 is operatively connected to each of the energy absorbers 14.

In examples including more than one actuator 20, the actuators 20 may be of the same type. One actuator 20 may release one or more energy absorbers 14 to the uncompressed position. In the example shown in the figures, one actuator 20 simultaneously releases all of the energy absorbers 14 to the uncompressed position.

The actuators 20 are configured to unseal the chamber 18 to release the energy absorbers 14 from the compressed position to the uncompressed position. For example, as described above, the actuator 20 is operatively connected to the plug 38. Specifically, in the example shown in the figures, the wire 36 extends from the actuator 20 to the energy absorber 14. The wire 36 in the example shown in the figures includes multiple branches that connect to the multiple energy absorbers 14. The wire 36 is pulled by the actuator 20 to simultaneously release all of the energy absorbers 14 to the uncompressed position.

The actuator 20 may be pyrotechnically activated to release the energy absorber 14 from the compressed position to the uncompressed position, e.g. to pull the wire 36. In such an example, the actuator 20 includes a pyrotechnic charge in a housing. The pyrotechnic charge is activated to activate the actuator 20. The pyrotechnic device may be, for example, a rotary actuator 20 or a linear actuator 20. The pyrotechnic charge is combustible to produce a gas, e.g., to retract a piston or turn a wheel, to retract the wire 36 into the housing of the actuator 20. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2). The wire 36 may be metal, polymeric, or any suitable type of material.

Figure 7:
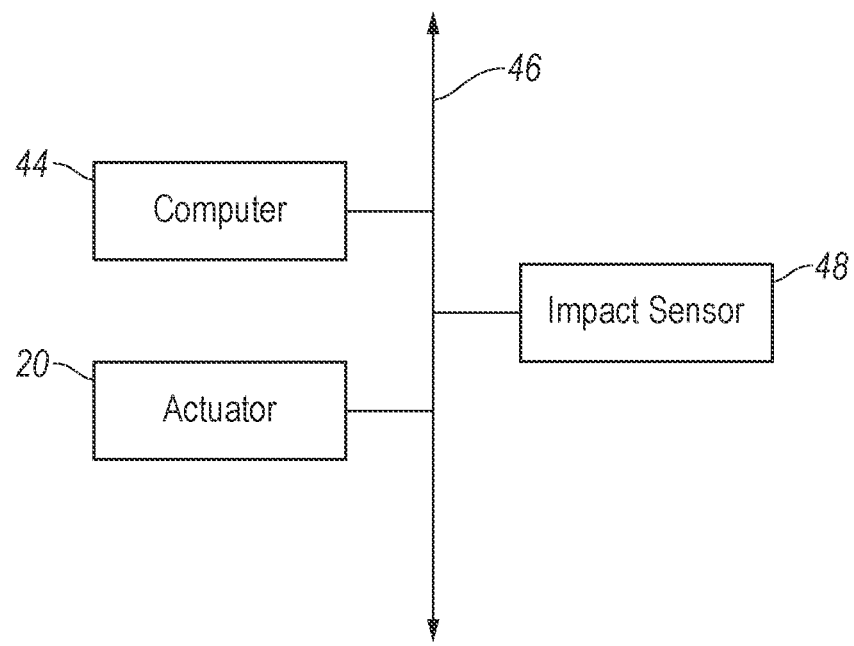
FIG. 7 is a block diagram of a system of the vehicle.

With reference to FIG. 7, the vehicle 10 includes a computer 44 that controls the actuator 20 based on input from impact sensors 48. Use of "in response to," "based on," and "upon determining" herein indicates a causal relationship, not merely a temporal relationship. The computer 44 may be, for example, a restraints control module. The computer 44 includes a processor and a memory. The memory includes one or more forms of computer readable media, and stores instructions executable by the computer 44 for performing various operations, including as disclosed herein. For example, a computer 44 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 44 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the computer 44, and the computer 44 can retrieve information stored by the memory via a network in the vehicle 10, e.g., over a CAN bus, a wire 36 less network, etc. The computer 44 is generally arranged for communications on a vehicle communication network 46 that can include a bus in the vehicle such as a controller area network CAN or the like, and/or other wired and/or wireless mechanisms. Alternatively or additionally, in cases where the computer 44 includes a plurality of devices, the vehicle communication network 46 may be used for communications between devices represented as the computer 44 in this disclosure. Further, as mentioned below, various controllers and/or sensors may provide data to the computer 44 via the vehicle communication network 46.

The vehicle 10 may include at least one impact sensor 48 for sensing impact of the vehicle 10, e.g., for sensing pedestrian impact. The impact sensor 48 is in communication with the computer 44. The computer 44 may activate the actuator 20, e.g., provide an impulse to a pyrotechnic charge of the actuator 20 when the impact sensor 48 senses pedestrian impact. The impact sensor 48 is configured to detect an impact to the vehicle 10. The impact sensor 48 may be configured to sense impact prior to impact, i.e., pre-impact sensing. In such an example, the computer 44 may activate the actuator 20 before impact between the vehicle 10 and the pedestrian to release the energy absorber 14 to the uncompressed position prior to impact with the pedestrian. The impact sensor 48 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 48 may be located at numerous points in or on the vehicle 10.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle-hood assembly comprising:
a vehicle hood;
an energy absorber fixed to the vehicle hood, the energy absorber being releasable from a compressed position to an uncompressed position, the energy absorber including a chamber that is sealed and vacuum pressurized in the compressed position;
an actuator configured to unseal the chamber to release the energy absorber from the compressed position to the uncompressed position; and
a wire extending from the actuator to the energy absorber.

2. The vehicle-hood assembly as set forth in claim 1, further comprising more than one of the energy absorber, the energy absorbers being spaced from each other along the vehicle hood.

3. The vehicle-hood assembly as set forth in claim 2, wherein the actuator is operatively connected to each of the energy absorbers to unseal the chambers of the energy absorbers.

4. The vehicle-hood assembly as set forth in claim 1, wherein the energy absorber includes an open-celled foam.

5. The vehicle-hood assembly as set forth in claim 4, wherein the energy absorber includes a membrane surrounding the chamber, the membrane being impermeable to air.

6. The vehicle-hood assembly as set forth in claim 5, wherein the energy absorber includes a plug through the membrane, the actuator being operatively connected to the plug.

7. The vehicle-hood assembly as set forth in claim 6, wherein the wire extends from the actuator to the plug.

8. The vehicle-hood assembly as set forth in claim 1, wherein the actuator is a pyrotechnic actuator.

9. The vehicle-hood assembly as set forth in claim 1, further comprising adhesive connecting the energy absorber to the vehicle hood.

10. The vehicle-hood assembly as set forth in claim 1, wherein the energy absorber expands in a direction away from the vehicle hood from the compressed position to the uncompressed position.

11. A vehicle comprising:
a vehicle hood;
a vehicle component beneath the vehicle hood, the vehicle component being rigid relative to the vehicle hood;
an energy absorber between the vehicle hood and the vehicle component, the energy absorber being fixed to the vehicle hood, the energy absorber being releasable from a compressed position to an uncompressed position, the energy absorber including a chamber that is sealed and vacuum pressurized in the compressed position;
an actuator configured to unseal the chamber to release the energy absorber from the compressed position to the uncompressed position; and
a wire extending from the actuator to the energy absorber.

12. The vehicle as set forth in claim 11, wherein the vehicle component is a vehicle-engine.

13. The vehicle as set forth in claim 11, further comprising more than one of the energy absorber, the energy absorbers being spaced from each other along the vehicle hood.

14. The vehicle as set forth in claim 13, wherein the actuator is operatively connected to each of the energy absorber.

15. The vehicle as set forth in claim 11, wherein the energy absorber includes an open-celled foam.

16. The vehicle as set forth in claim 15, wherein the energy absorber includes a membrane surrounding the chamber, the membrane being impermeable to air.

17. The vehicle as set forth in claim 16, wherein the energy absorber includes a plug through the membrane, the actuator being operatively connected to the plug.

18. The vehicle as set forth in claim 11, wherein the energy absorber is supported by and connected to the vehicle hood.

19. The vehicle as set forth in claim 11, wherein the energy absorber expands from the compressed position to the uncompressed position toward the vehicle component.

20. A vehicle-hood assembly comprising:
a vehicle hood;
an energy absorber fixed to the vehicle hood, the energy absorber being releasable from a compressed position to an uncompressed position, the energy absorber including a chamber that is sealed and vacuum pressurized in the compressed position;
an actuator configured to unseal the chamber to release the energy absorber from the compressed position to the uncompressed position; and
more than one of the energy absorber, the energy absorbers being spaced from each other along the vehicle hood;
the actuator being operatively connected to each of the energy absorbers to unseal the chambers of the energy absorbers.

\* \* \* \* \*